United States Patent
Vissers et al.

(10) Patent No.: US 9,546,683 B2
(45) Date of Patent: Jan. 17, 2017

(54) FLANGED BEARING RING FOR A MOTOR VEHICLE WHEEL BEARING UNIT

(75) Inventors: Cornelius Petrus Antonius Vissers, Den Dungen (NL); Paolo Re, Nichelino (IT)

(73) Assignee: AKTIEBOLAGET SKF, Gothenburg (SE)

( * ) Notice: Subject to any disclaimer, the term of this patent is extended or adjusted under 35 U.S.C. 154(b) by 1194 days.

(21) Appl. No.: 13/087,551

(22) Filed: Apr. 15, 2011

(65) Prior Publication Data

US 2011/0255818 A1 Oct. 20, 2011

(30) Foreign Application Priority Data

Apr. 15, 2010 (IT) .................................. TO10A0305

(51) Int. Cl.
*F16C 13/00* (2006.01)
*F16C 33/60* (2006.01)
*F16C 33/64* (2006.01)
*F16C 19/38* (2006.01)

(52) U.S. Cl.
CPC ............. *F16C 33/60* (2013.01); *F16C 19/386* (2013.01); *F16C 33/64* (2013.01); *F16C 2220/06* (2013.01); *F16C 2326/02* (2013.01)

(58) Field of Classification Search
USPC ....... 384/492, 493, 513, 537, 544, 557, 585, 384/589; 301/105.1
See application file for complete search history.

(56) References Cited

U.S. PATENT DOCUMENTS

| | | | | |
|---|---|---|---|---|
| 1,652,468 A | * | 12/1927 | Catlin | 384/296 |
| 3,938,864 A | | 2/1976 | Haussels | |
| 4,125,298 A | * | 11/1978 | Heurich et al. | 384/537 |
| 4,213,660 A | * | 7/1980 | Yasui et al. | 384/585 |
| 5,079,825 A | * | 1/1992 | Matsui et al. | 29/520 |
| 5,542,752 A | * | 8/1996 | Quaglia | 301/64.702 |
| 5,882,123 A | * | 3/1999 | Lee et al. | 384/569 |
| 6,238,096 B1 | * | 5/2001 | Allen et al. | 384/495 |
| 6,485,188 B1 | * | 11/2002 | Dougherty | 384/589 |
| 6,626,579 B1 | * | 9/2003 | Silvasi | 384/476 |
| 6,715,925 B2 | * | 4/2004 | Pairone et al. | 384/536 |
| 6,866,422 B2 | * | 3/2005 | Griseri et al. | 384/537 |
| 2007/0098315 A1 | * | 5/2007 | Komori et al. | 384/544 |

FOREIGN PATENT DOCUMENTS

| | | |
|---|---|---|
| DE | 19918351 A1 | 10/2000 |
| DE | 10061663 A1 | 6/2002 |

(Continued)

*Primary Examiner* — James Pilkington
(74) *Attorney, Agent, or Firm* — Bryan Peckjian; SKF USA Inc. Patent Dept.

(57) ABSTRACT

A flanged bearing ring is formed of two different materials joined together as a single piece, specifically a radially inner annular insert and a flanged, radially outer lightweight body formed about the insert. The insert has one or more inner raceways and is formed of a hard material, such as bearing steel. The outer body is made of a lightweight material, such as aluminium alloy, with a higher thermal expansion coefficient higher than that of the hard material from which the inner insert is formed. A radial projection formed on the insert extends into a radial groove of the outer body. The projection and the recess interlock the insert and the outer body so as to prevent relative movement.

17 Claims, 3 Drawing Sheets

(56) References Cited

FOREIGN PATENT DOCUMENTS

| | | |
|---|---|---|
| EP | 1046828 A2 | 10/2000 |
| EP | 1830097 A1 | 9/2007 |
| GB | 1510546 A | 5/1978 |
| WO | WO2008147284 A1 | 12/2008 |
| WO | WO2010012283 A1 | 2/2010 |
| WO | WO2010012284 A1 | 2/2010 |

* cited by examiner

FLANGED BEARING RING FOR A MOTOR VEHICLE WHEEL BEARING UNIT

CROSS REFERENCE

This application claims priority to Italian Patent Application No. TO2010A000305 filed on Apr. 15, 2010, the contents of which are incorporated fully herein by reference.

BACKGROUND OF THE INVENTION

The present invention relates to bearings, and more particularly to a lightweight, flanged bearing ring for the hub of a motor vehicle wheel.

The bearing ring of a typical wheel hub bearing assembly may either be a stationary ring with a flange for mounting the relevant hub-bearing unit to the suspension standard of a motor vehicle, or a rotatable ring where the flange provides connection to the wheel and/or the brake rotor.

There is an ever increasing demand for weight reduction in motor vehicle components for in order to lower fuel consumption and exhaust emissions. With a vehicle wheel bearing, weight reduction must not result in a reduction in strength and/or safety. The raceways must be made of a material of hardness sufficient to resist the stresses of rolling contact. Conventional bearing steel is still widely used, although other materials have been proposed, such as ceramics and titanium, which provide good mechanical performance but are considerably more expensive as compared to bearing steel.

WO 2008/147284 A1 discloses a bearing ring made up of two different materials joined together in a single piece, namely a first, high toughness material such as bearing steel forming the raceways and a second, lightweight material, such as a lightweight metal, forming the rest of the ring. The second material is joined to the first material by a semi-solid casting process.

SUMMARY OF THE INVENTION

It is an object of the present invention to improve the connection between the two different portions of a flanged bearing ring made of two different materials, namely a first, hard material and a second, lightweight material. Particularly, it is desired to improve such a connection at room temperature.

The present invention is directed to a flanged bearing ring for a motor vehicle wheel that provides improvements in the key areas of bearing ring performance. That is, the bearing ring of the invention provides a lower weight, while ensuring the required high strength capabilities. The ring is made up of two different materials joined together as a single piece, and includes a radially inner, annular or tubular insert, and a radially outer body formed around the insert. The insert forms one or more raceways and is made of a hard material with a first thermal expansion coefficient. The outer body provides a radially outwardly extending flange and is made of a lightweight material with a second thermal expansion coefficient higher than that of the first material. Interlocking means, formed by the insert and the outer body, lock these two bodies together against relative axial movement. The interlocking means include one or more radially protruding portions at an outer surface of the insert. Respective, complementary radially recesses are formed by the outer body, thereby preventing axial movement between the outer body and the inner insert at least at room temperature. Preferably, these mating protrusions and recesses at the interface between the outer body and the inner insert are so shaped as also prevent relative rotary movement between the outer body and the inner insert.

Other features and advantages of the invention will become apparent to those skilled in the art upon review of the following detailed description, claims and drawings in which like numerals are used to designate like features.

BRIEF DESCRIPTION OF THE DRAWINGS

In order that the present invention may be well understood there will now be described a few preferred embodiments thereof, given by way of example, reference being made to the accompanying drawings, in which.

DETAILED DESCRIPTION OF THE INVENTION

Figure 1:
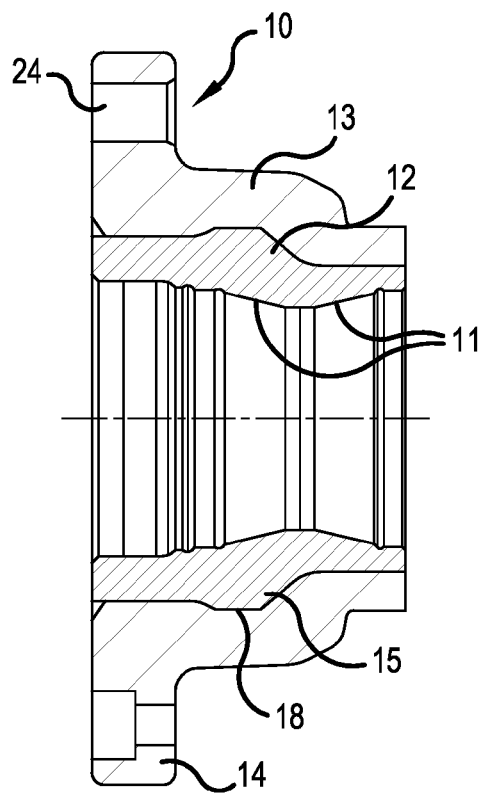
FIG. 1 is an axial cross-sectional view of a first embodiment of a bearing ring according to the invention.
Figure 2:
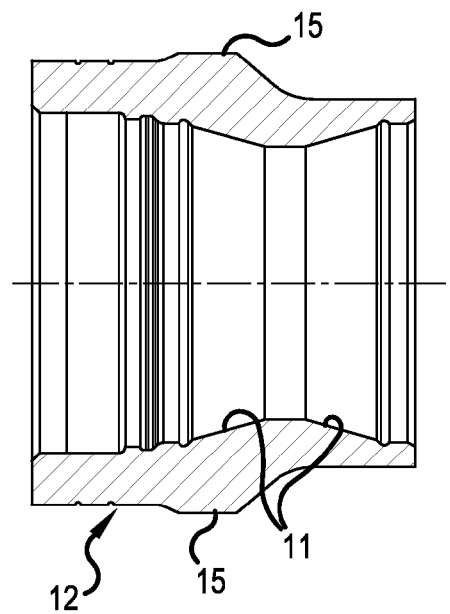
FIG. 2 is an axial cross-sectional view of an annular insert comprised in the bearing ring of FIG. 1.
Figure 3:
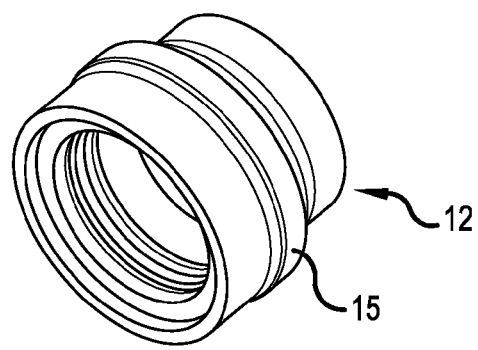
FIG. 3 is a perspective view of the insert of FIG. 2.

Referring first to FIGS. 1 to 3, a flanged bearing ring 10 in accordance with a first embodiment of the invention is depicted. The ring 10 in this example is a bearing ring for vehicle applications, particularly for rotatably mounting a wheel (not shown) to a stationary suspension standard (not shown) of the vehicle. The bearing ring 10 has two outer raceways 11 for two rows of rolling elements, in this example tapered rollers.

The ring 10 comprises a radially inner insert 12 of generally annular or tubular shape and a radially outer body 13 providing a radially outwardly extending flange 14 near an outboard end of the insert 12. The flange 14 provides a number of through bores 24 to allow connection to the suspension standard by means of stud bolts. Although the bearing ring shown in FIG. 1 is a radially outer bearing ring, the ring structure described below may also be used with other types of flanged bearing rings, for example a rotatable, radially inner (or outer) bearing ring the radial flange of which is to be fixed to the wheel. Throughout the present description and the claims, terms and expressions indicating positions and directions such as "radial" and "axial" are understood as referring to the axis of rotation x of the bearing. Expressions such as "inboard" and "outboard" instead refer a condition when mounted on a vehicle.

The radially inner insert 12 is made of a first, relatively hard material having a first, lower volumetric thermal expansion coefficient, whereas the radially outer body 13 is made of a second, "lightweight" (i.e., relatively low density) material with a second, volumetric thermal expansion coefficient higher than that of the first material which the insert 12 is made of. Since the insert 12 forms one or more raceways, a hard and tough material suitable for the insert is, for example, a bearing grade steel. As alternatives, low carbon steel or ceramic may be used. As a lightweight material for the outer body 13, a lightweight or relatively low density metal is preferred, such as aluminium, magnesium, or alloys thereof. Other suitable materials for the outer section may include, but not be limited to, carbon composites or reinforced polymers.

The insert 12 is machined so as to form, in its radially outer surface, at least one radially protruding and circumferentially extending annular projection 15. The projection 15 is defined by a central circumferential portion of greater diameter than the remainder of the outer surface and a pair of opposing generally radial surfaces extending between each edge of the central portion and the outer surface. In a preferred embodiment, the projection 15 extends circumferentially and continuously about the outer surface of the insert 12. Alternatively, the insert 12 may include a plurality of radial projections 15 spaced apart circumferentially about the central axis x. In either case, as discussed in greater detail below, the projection(s) 15 is/are part of an interlocking means for substantially preventing relative axial movement or displacement between the insert 12 and the outer body 13. To some extent, depending on the cross-sectional shape of the relief, these interlocking means will also prevent radial movement between the insert 12 and the outer body 13, when one or more undercuts 20 are provided, as in the embodiments of FIGS. 4 and 6.

Preferably, the outer body 13 is formed and joined to the insert 12 through a semi-solid casting process, which is a near net shape process wherein the metal of the outer body is formed at a temperature between liquid and solid states. The advantage of a semi-solid casting process with respect to a molten metal process, such as high pressure die casting, is that the outer body obtains a denser, dendrite-free microstructure providing the strength and crack-propagation resistance required for bearing applications. Also, the semi-solid casting process allows the outer body to achieve accurately the required shape also in those instances where the surfaces at the interface between the insert 12 and the outer body 13 have a particularly complex shape, for example if undercuts are provided.

The wheel-mounting flange 14 and the outer surface of the spigot 17 can be formed with the necessary geometry to ensure sufficient stiffness. Moreover, the bores 24 in the wheel mounting flange 14 can be provided during the semi-solid casting process, by forming the semi-solid metal of the flange 14 around appropriately positioned threaded nuts or stud bolts.

A rheocasting process is one example of a preferred semi-solid casting process. Using aluminium as an example of the lightweight metal for the outer body 13, a rheocasting process initially involves bringing the aluminium to a molten (liquid) state. The molten aluminium is then allowed to cool and is stirred during solidification to obtain a semi-solid slurry. The step of cooling can involve adding solid particles of aluminium to the molten material and, for enhanced efficiency, the solid particles can be added via a stirring mechanism. An exchange of enthalpy or heat takes place between the liquid aluminium and the solid particles, which facilitates the formation of the slurry and can dispense from the need for external cooling. The semi-solid aluminium slurry is then injection-moulded to the inner insert 12 with the aid of a suitable die that defines the required shape of the wheel mounting flange 14.

While it is preferred, as already indicated, to form the outer body 13 by a semi-solid casting process, in its broadest aspect the invention is not so limited and encompasses the possibility of sintering or casting, die-casting or otherwise forming the outer body about the inner insert 12.

As the second material of the outer body 13 cools and solidifies, it shrinks. Basically, contraction occurs in a radially inward direction, towards the central axis of rotation x of the bearing unit. Thus, the semi-solid metal of the outer body 13 shrinks around the one or more projections 15 of the insert 12 and forms at least one recess or groove 18 tightly copying or following the shape of the projection(s) 15, so as to interlock together the outer body 13 and the insert 12, thereby preventing any relative axial movement between the outer body 13 and the insert 12. Preferably, the projection 15 of the insert 12 and the recess 18 of the outer body 13 each extend circumferentially and substantially continuously about the central axis x. Alternatively, the insert 12 may have a plurality of radial projections 15 spaced apart circumferentially about the central axis x and the outer body 13 may include a plurality of radial recesses 18 spaced apart circumferentially about the central axis x, each recess 18 being configured to receive a separate one of the projections 15.

The interlocking means 15, 18 may be formed in a variety of different structures. In a less preferred embodiment (not shown), the projection 15 (and the mating recess 18) may have a generally rectangular cross-sectional shape as taken in an axial plane. In the preferred embodiments, the projection 15 has one or more undercuts 20, in order to provide a higher degree of interlock against relative movement between the outer body and the inner insert in a direction perpendicular to the axis of rotation x (i.e., radial movement).

In a bearing ring according to an embodiment of the present invention the outer body may include an inner surface mating with the outer surface of the insert. In this embodiment, at least a portion of at least one of the insert and the outer body has an at least partially non-cylindrical radial cross-section such that engagement of the mating surfaces prevents relative rotational displacement between the outer body and the insert.

A variety of different wheel bearing unit designs can be produced incorporating the bearing ring 10 of the present invention. For example, the bore of the insert 12 can serve as an outer raceway for rolling elements of a constant velocity joint and the bearing unit may further comprise an integral CV joint. Moreover, the bearing unit may be a single row or a double-row angular contact bearing in which the rolling elements are balls, rollers, flattened balls etc. Also, when the unit is a double-row bearing, the raceways for the first and second rows of rolling elements can be equal in diameter, or the diameters can differ.

Figure 4:
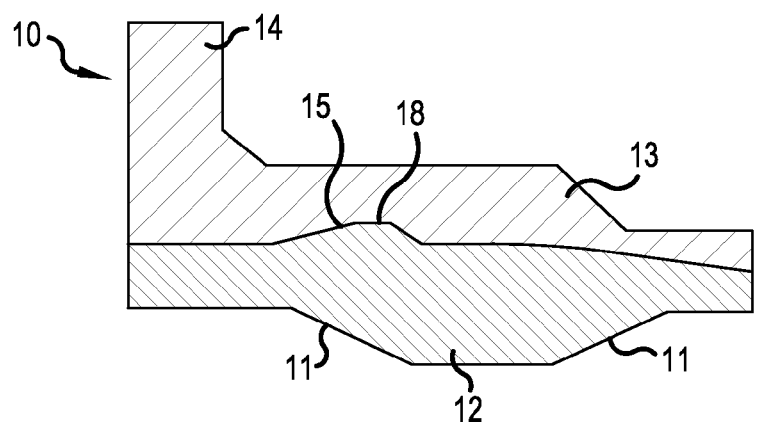
FIGS. 4-7 are partial, axial cross-sectional views of bearing rings made in accordance with other different embodiments of the invention.
Figure 5:
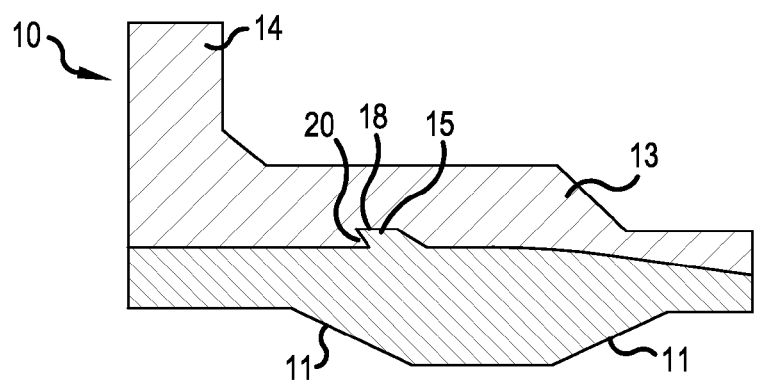
Figure 6:
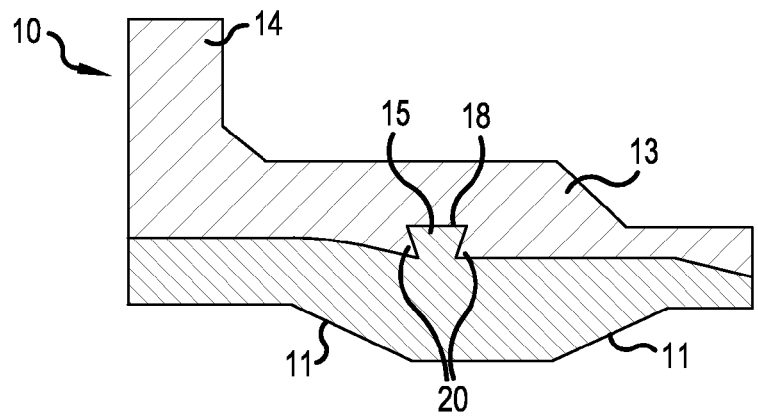
Figure 7:
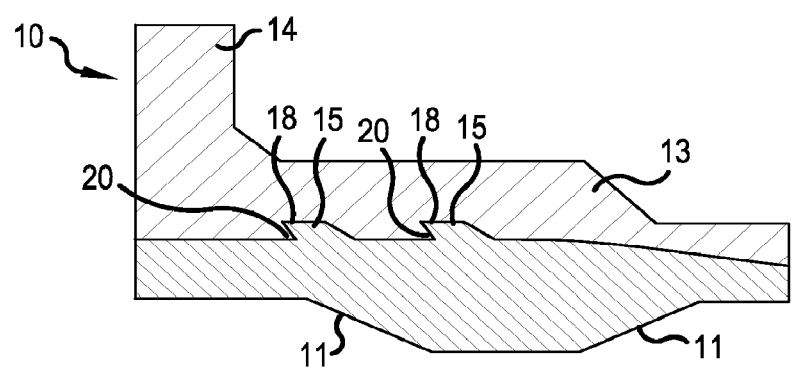

Further embodiments are schematically depicted in FIGS. 4 to 6. FIG. 4 shows an example of a projection 15 having two opposite conical surfaces at an obtuse angle, i.e. tapering away from each other. In the embodiment of FIG. 5, the projection 15 has two conical surfaces tapering in a same direction. The two conical surfaces are generally parallel or extend at an acute angle and one of the surfaces forms an undercut 20. Stated differently, the at least one projection may include a radially outer wall spaced from the radially outer surface and first and second parallel walls extending in a non-radial direction from the radial outer wall to the radially outer surface. In the embodiment of FIG. 6, the projection 15 has two conical surfaces tapering towards one another, providing two undercuts 20. By virtue of this shape, the groove 18 and the projection 15 are each generally shaped so as to form a dovetail joint.

While a few illustrative embodiments have been disclosed in the foregoing summary and detailed description, it should be appreciated that a vast number of variations exist. It should also be appreciated that the illustrative embodiments are only examples, and are not intended to limit the scope, applicability, or configuration in any way. Rather, the foregoing summary and detailed description will provide those skilled in the art with a convenient road map for implementing the invention, it being understood that various changes may be made in the function and arrangement of elements described in the exemplary embodiments without departing from the scope as set forth in the appended claims and their legal equivalents.

We claim:

1. A flanged bearing ring for a motor vehicle wheel, the ring comprising:
a radially inner, generally annular insert formed of a first material with a first thermal expansion coefficient, the insert having a central axis, at least one raceway extending about the axis, a radially outer surface, and at least one projection extending generally radially from the outer surface; and
a radially outer body formed of a second material with a second thermal expansion coefficient, the second coefficient being greater than the first coefficient, the outer body being disposed about the insert and having a radially outwardly extending flange and at least one radial recess configured to receive the at least one projection of the insert so as to interlock and prevent relative axial displacement between the insert and the outer body,
wherein the at least one projection of the insert has an undercut engageable with the at least one recess of the outer body so as to prevent relative radial movement between the outer body and the insert, and
wherein the at least one projection has two conical surfaces tapering in a same direction, one of the two conical surfaces forming the undercut.

2. The bearing ring according to claim 1 wherein the first material has a first density and the second material has a second density, the second density being lesser than the first density.

3. The bearing ring according to claim 1, wherein the projection of the insert extends circumferentially and substantially continuously about the outer surface of the insert.

4. The bearing ring according to claim 3, wherein one of the outer body inner surface and the insert outer surface has a plurality of circumferentially spaced apart, radially extending protrusions and the other one of the outer body inner surface and the insert outer surface having a plurality of circumferentially spaced apart recesses each configured to receive a separate one of the radial protrusions.

5. The bearing ring according to claim 1, wherein the outer body has an inner surface mating with the outer surface of the insert, at least a portion of at least one of the insert and the outer body having an at least partially non-cylindrical radial cross-section such that engagement of the mating surfaces prevents relative rotational displacement between the outer body and the insert.

6. The bearing ring according to claim 1, wherein the first material is one of bearing grade steel, a low-carbon steel and a ceramic material.

7. The bearing ring according to claim 1, wherein the second material is one of aluminium, magnesium, an aluminium alloy and a magnesium alloy.

8. The bearing ring according to claim 1, wherein the outer body is joined to the insert by a semi-solid casting process.

9. The bearing ring according to claim 8, wherein the semi-solid casting process is one of a thixoforming process, a thixocasting process, a thixoforging process, a thixojoining process, a rheoforming process, a rheocasting process, a rheoforging process, and a rheojoining process.

10. The bearing ring according to claim 1, wherein each one of the at least one radial projection of the insert and the at least one radial recess of the outer body extends circumferentially about the central axis, the recess being complementary to the projection.

11. The bearing ring according to claim 1 wherein the at least one radial projection of the insert includes a plurality of radial projections spaced apart circumferentially about the central axis and the at least one recess of the outer body includes a plurality of radial recesses spaced apart circumferentially about the central axis, each recess being configured to receive a separate one of the projections.

12. The bearing ring according to claim 1, wherein the two conical surfaces are generally parallel.

13. A flanged bearing ring for a motor vehicle wheel, the ring comprising:
a radially inner, generally annular insert formed of a first material with a first thermal expansion coefficient, the insert having an insert axial length, a central axis, at least one raceway extending about the axis, a radially outer surface, and at least one projection extending generally radially from the outer surface; and
a radially outer body formed of a second material with a second thermal expansion coefficient, the second coefficient being greater than the first coefficient, the outer body being disposed about the insert and having an outer body axial length equal to the insert axial length, a radially outwardly extending flange and at least one radial recess configured to receive the at least one projection of the insert so as to interlock and prevent relative axial displacement between the insert and the outer body.

14. The bearing ring according to claim 13, wherein the at least one projection of the insert has an undercut engageable with the at least one recess of the outer body so as to prevent relative radial movement between the outer body and the insert.

15. The bearing ring according to claim 13, wherein the at least one projection includes a radially outer wall spaced from the radially outer surface and first and second parallel walls extending in a non-radial direction from the radial outer wall to the radially outer surface.

16. The bearing ring according to claim 13, wherein the at least one projection has two conical surfaces tapering in a same direction.

17. The bearing ring according to claim 16, wherein the two conical surfaces are generally parallel and one of the two conical surfaces forms an undercut.

* * * * *